US007809375B2

(12) United States Patent
Thermond

(10) Patent No.: US 7,809,375 B2
(45) Date of Patent: Oct. 5, 2010

(54) HOME WIRELESS ROUTER VOIP BANDWIDTH MANAGEMENT

(75) Inventor: Jeffrey L. Thermond, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 1492 days.

(21) Appl. No.: 10/845,950

(22) Filed: May 14, 2004

(65) Prior Publication Data

US 2005/0265323 A1 Dec. 1, 2005

(51) Int. Cl.
*H04W 36/00* (2009.01)
(52) U.S. Cl. .................. 455/442; 455/41.2; 370/352
(58) Field of Classification Search .......... 370/463, 370/401, 466, 352–356; 455/436–444
See application file for complete search history.

(56) References Cited

U.S. PATENT DOCUMENTS

| | | | | |
|---|---|---|---|---|
| 6,831,903 B2 * | 12/2004 | Kang | ........................ | 370/328 |
| 6,987,985 B2 * | 1/2006 | Purkayastha et al. | ..... | 455/552.1 |
| 7,133,670 B1 * | 11/2006 | Moll et al. | ............... | 455/432.1 |
| 7,188,185 B2 * | 3/2007 | Dowling | ..................... | 709/230 |
| 7,257,106 B2 * | 8/2007 | Chen et al. | .................. | 370/338 |
| 7,266,683 B1 * | 9/2007 | Nag | ........................... | 713/154 |
| 7,315,742 B2 * | 1/2008 | Creamer et al. | ............. | 455/442 |
| 7,324,491 B1 * | 1/2008 | Benveniste | ................... | 370/338 |
| 7,382,791 B2 * | 6/2008 | Thermond | ................... | 370/401 |
| 7,403,544 B2 * | 7/2008 | Thermond | ................... | 370/477 |
| 7,424,008 B2 * | 9/2008 | Thermond | ................... | 370/352 |
| 2002/0191635 A1 * | 12/2002 | Chow et al. | .................. | 370/463 |
| 2004/0251887 A1 * | 12/2004 | Sparrell et al. | .............. | 323/312 |
| 2005/0190747 A1 * | 9/2005 | Sindhwani et al. | .......... | 370/352 |
| 2005/0265553 A1 * | 12/2005 | Thermond | ................... | 380/275 |
| 2006/0029050 A1 * | 2/2006 | Harris et al. | ................. | 370/356 |
| 2006/0133414 A1 * | 6/2006 | Luoma et al. | ............... | 370/466 |
| 2007/0038750 A1 * | 2/2007 | Jorgensen | .................... | 709/226 |
| 2007/0153768 A1 * | 7/2007 | Jagadesan et al. | ........... | 370/352 |
| 2007/0183406 A1 * | 8/2007 | Bennett | ...................... | 370/352 |
| 2007/0206535 A1 * | 9/2007 | Sood et al. | .................. | 370/331 |
| 2007/0223430 A1 * | 9/2007 | Desai et al. | .................. | 370/338 |
| 2007/0286079 A1 * | 12/2007 | Mollenkopf et al. | ........ | 370/236 |

* cited by examiner

*Primary Examiner*—Simon Sing
(74) *Attorney, Agent, or Firm*—Garlick Harrison & Markison

(57) ABSTRACT

A home wireless router establishes a Wireless Local Area Network (WLAN) that supports wireless communications within a WLAN service area. The home wireless router further establishes broadband communications via a broadband connection with a VoIP service accumulator. The home wireless router services a plurality of wireless terminals within the WLAN service area, including at least one Voice over Internet Protocol (VoIP) wireless terminal. The home wireless router determines that a VoIP wireless terminal desires VoIP call servicing. The home wireless router sends a bandwidth reservation request to the VoIP service accumulator to reserve capacity on the broadband connection for servicing of the VoIP call. The home wireless router then receives a bandwidth reservation response from the VoIP service accumulator to confirm reservation of capacity on the broadband connection for servicing of the VoIP call. The home wireless router then services the VoIP call for the VoIP wireless terminal via the WLAN and the broadband connection.

16 Claims, 8 Drawing Sheets

HOME WIRELESS ROUTER VOIP BANDWIDTH MANAGEMENT

FIELD OF THE INVENTION

This invention relates generally to Wireless Local Area Networks (WLANs); and more particularly to the servicing of Voice over Internet Protocol (VoIP) communications by WLANs.

BACKGROUND OF THE INVENTION

Communication technologies that link electronic devices in a networked fashion are well known. Examples of communication networks include wired packet data networks, wireless packet data networks, wired telephone networks, wireless telephone networks, and satellite communication networks, among other networks. These communication networks typically include a network infrastructure that services a plurality of client devices. The Public Switched Telephone Network (PSTN) is probably the best-known communication network that has been in existence for many years. The Internet is another well-known example of a communication network that has also been in existence for a number of years. These communication networks enable client devices to communicate with one another other on a global basis. Wired Local Area Networks (wired LANs), e.g., Ethernets, are also quite common and support communications between networked computers and other devices within a serviced area. Wired LANs also often link serviced devices to Wide Area Networks and the Internet. Each of these networks is generally considered a "wired" network, even though some of these networks, e.g., the PSTN, may include some transmission paths that are serviced by wireless links.

Wireless networks have been in existence for a relatively shorter period. Cellular telephone networks, wireless LANs (WLANs), and satellite communication networks, among others, are examples of wireless networks. Relatively common forms of WLANs are IEEE 802.11a networks, IEEE 802.11b networks, and IEEE 802.11g networks, referred to jointly as "IEEE 802.11 networks." In a typical IEEE 802.11 network, a wired backbone couples to a plurality of Wireless Access Points (WAPs), each of which supports wireless communications with computers and other wireless terminals that include compatible wireless interfaces within a serviced area. The wired backbone couples the WAPs of the IEEE 802.11 network to other networks, both wired and/or wireless, and allows serviced wireless terminals to communicate with devices external to the IEEE 802.11 network.

WLANs provide significant advantages when servicing portable devices such as portable computers, portable data terminals, and other devices that are not typically stationary and able to access a wired LAN connection. However, WLANs provide relatively low data rate service as compared to wired LANs, e.g., IEEE 802.3 networks. Currently deployed wired LANs provide up to one Gigabit/second bandwidth and relatively soon, wired LANs will provide up to 10 Gigabit/second bandwidths. However, because of their advantages in servicing portable devices, WLANs are often deployed so that they support wireless communications in a service area that overlays with the service area of a wired LAN. In such installations, devices that are primarily stationary, e.g., desktop computers, couple to the wired LAN while devices that are primarily mobile, e.g., laptop computers, couple to the WLAN. The laptop computer, however, may also have a wired LAN connection that it uses when docked to obtain relatively higher bandwidth service.

Other devices may also use the WLAN to service their communication needs. One such device is a WLAN phone, e.g., an IEEE 802.11 phone that uses the WLAN to service its voice communications. The WLAN communicatively couples the IEEE 802.11 phone to other phones across the PSTN, other phones across the Internet, other IEEE 802.11 phones, and/or to other phones via various communication paths. IEEE 802.11 phones provide excellent voice quality and may be used in all areas serviced by the WLAN. Typically, the IEEE 802.11 phones support a Voice over Internet Protocol (VoIP) application. Thus, hereinafter, IEEE 802.11 phones may be also referred to as WLAN VoIP terminals.

Significant problems exist, however, when using a WLAN to support VoIP calls. Because WLANs typically service both VoIP calls and data communications, the WLAN may not have sufficient wireless capacity to satisfy the low-latency requirements of the voice communication. The wireless capacity limitations are oftentimes exacerbated by channel access rules imposed in many IEEE 802.11 installations. Further, roaming within a WLAN (between WAPs) can introduce significant gaps in service, such gaps in service violating the low-latency requirements of the voice communication.

Home wireless routers oftentimes service WLANs (serve as WAPs) within a residential setting. The home wireless routers typically couple to the Internet via a cable modem or other broadband connection. The cable modem network capacity, however, is shared by a relatively large number of users and the availability of capacity to service communications between the home wireless router and the Internet varies over time. The limitations of this connection compromise the ability of the home wireless router to adequately service VoIP calls, even when the home wireless router's serviced WLAN has sufficient capacity. Such is the case because VoIP calls typically require a minimum of 64 Kbps for satisfactory service. When the broadband connection is a DSL connection at 384 kbps, for example, this limitation is even more pronounced.

Thus, there is a need in the art for improvements in the operation and management of WLAN devices, including home wireless routers, when servicing VoIP calls.

SUMMARY OF THE INVENTION

In order to overcome the above-cited shortcomings of the devices and systems, among other shortcomings, a home wireless router constructed and operating according to the present invention ensures that sufficient capacity exists and is reserved for the servicing of VoIP calls. The home wireless router establishes a Wireless Local Area Network (WLAN) that supports wireless communications within a WLAN service area. The home wireless router further establishes broadband communications via a broadband connection with a VoIP service accumulator. With these operations completed, the home wireless router services a plurality of wireless terminals within the WLAN service area. The plurality of wireless terminals includes at least one Voice over Internet Protocol (VoIP) wireless terminal. The home wireless router then determines that a VoIP wireless terminal desires VoIP call servicing. With this determination made, the home wireless router sends a bandwidth reservation request to the VoIP service accumulator to reserve capacity on the broadband connection for servicing of the VoIP call. The home wireless router then receives a bandwidth reservation response from the VoIP service accumulator to confirm reservation of capacity on the broadband connection for servicing of the VoIP call.

The home wireless router then services the VoIP call for the VoIP wireless terminal via the WLAN and the broadband connection.

In some embodiments, the broadband connection is serviced by a cable modem network. In these embodiments, the VoIP service accumulator may be an element of the cable modem network. In other embodiments, the broadband connection is a wireless connection such as a fixed wireless connection, a cellular network connection, or a microwave connection. In still other embodiments, the broadband connection is an optical connection, a DSL connection, a DSL2 connection, an ADSL connection, or an ADSL2 connection. In each of these embodiments, the VoIP service accumulator is typically an element within the servicing broadband network.

The bandwidth reservation request may conform to the Resource Reservation Protocol (RSVP). In such case, servicing the VoIP call for the VoIP wireless terminal via the broadband connection may proceed according to the Real-Time Transport Protocol (RTP). Of course, the bandwidth reservation request and VoIP call servicing may proceed according to other operating standards as well. The method of the present invention may further include limiting access to the WLAN in order to adequately service the VoIP call.

The method may further include the home wireless router determining that the VoIP call is being serviced by a cellular network. In such case, the home wireless network also determines that the VoIP wireless terminal has roamed into the WLAN service area. When these determinations are made, the home wireless router may determine that handover of the VoIP call to the WLAN is desired and interact with the cellular network to service handover of the VoIP call from the cellular network to the WLAN.

According to other aspects of the present invention, the VoIP wireless terminal services a WLAN encryption scheme while the broadband connection services a broadband encryption scheme. Thus, the home wireless router, in some operations, terminates a WLAN encryption scheme serviced by the VoIP wireless terminal and/or services the VoIP call via the broadband connection using a broadband encryption scheme.

The home wireless router typically includes a Wireless Local Area Network (WLAN) interface, a broadband interface, and a processing unit communicatively coupled to the WLAN interface and to the broadband interface. The home wireless router further includes memory, internal interfaces, and other internal components. The home wireless router may further include an encryption/decryption accelerator used in servicing the broadband encryption scheme corresponding to the broadband connection.

Other features and advantages of the present invention will become apparent from the following detailed description of the invention made with reference to the accompanying drawings.

DETAILED DESCRIPTION OF THE DRAWINGS

Figure 1:
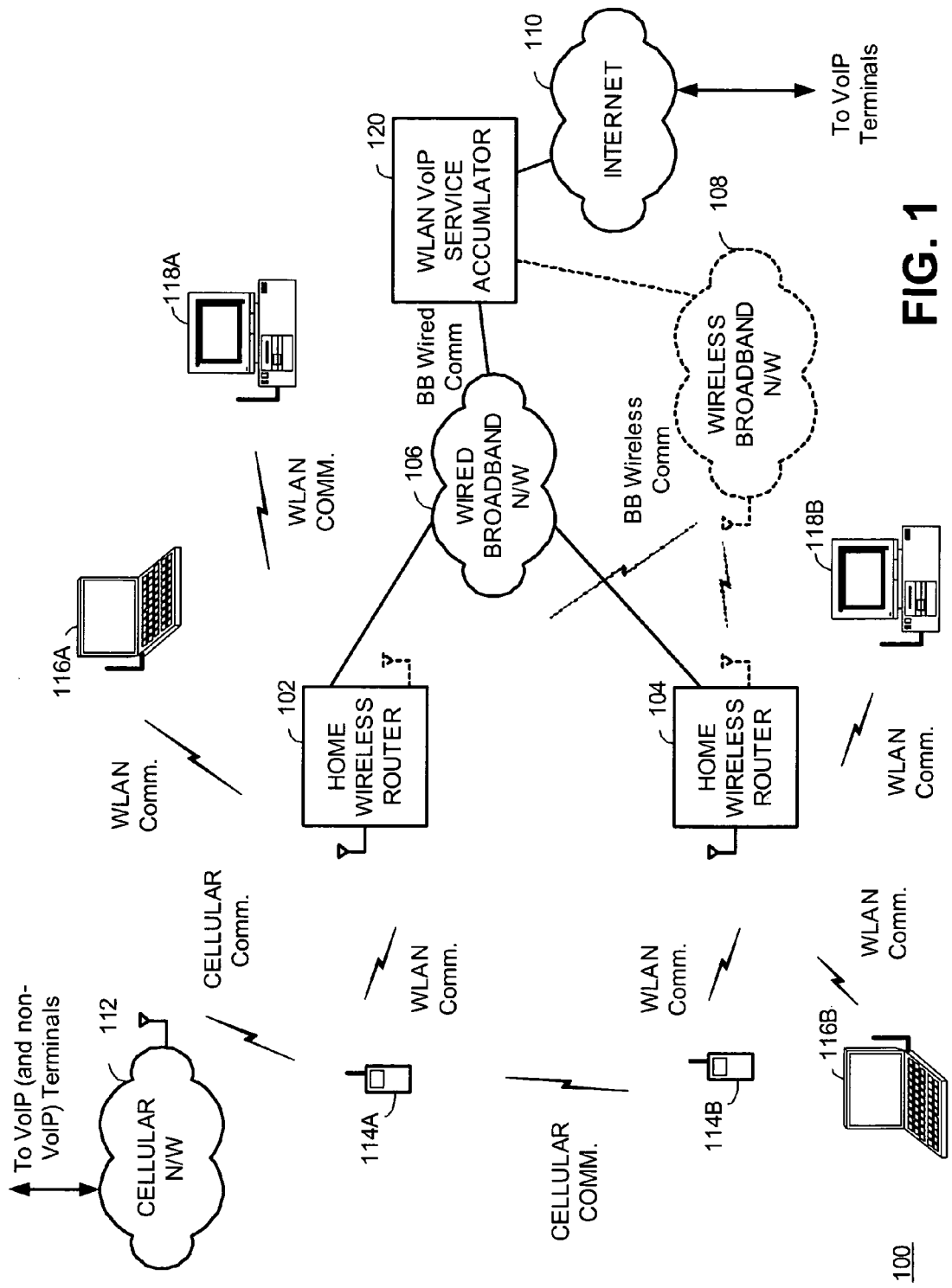
FIG. 1 is a system diagram illustrating a communication system constructed and operating according to the present invention.

FIG. 1 is a system diagram illustrating a communication system 100 constructed and operating according to the present invention. As shown in FIG. 1 the system 100 supports Wireless Local Area Network (WLAN) communications within at least one WLAN service area. Home wireless routers 102 and 104 each service wireless WLAN communications for respective WLAN service areas. Home wireless router 102 supports WLAN communications with wireless terminal 114A, wireless terminal 116A (laptop computer), and wireless terminal 118B (desktop computer). Likewise, home wireless router 104 supports WLAN communications within its respective WLAN service area. In supporting WLAN communications, home wireless router 104 supports wireless communications with wireless terminals 114B, 116B, and 118B. As the reader will appreciate, the numbers and types of wireless terminals that may be supported by the home wireless routers 102 and 104 vary from installation-to-installation.

Home wireless routers 102 and 104 support WLAN communications according to a standardized communication protocol. The WLAN communication protocol may be one or more of IEEE 802.11a, IEEE 802.11b, IEEE 802.11g, IEEE 802.11n, and/or another WLAN communication standard. Further, home wireless router 102 may support Wireless Personal Area Network (WPAN) communications via the Bluetooth communication standard, the IEEE 802.15 standard, or another communication standard.

Each of home wireless routers 102 and 104 couples to a broadband network via a broadband connection. In a first embodiment, a wired broadband network 106 services the broadband connections for the home wireless routers 102 and 104. The broadband network 106 may be a cable modem network or another wired network that provides the broadband connection, e.g., a DSL connection, a DSL2 connection, an ADSL connection, or an ADSL2 connection, for example. In another embodiment, a wireless broadband network 108 services the broadband connections for the home wireless routers 102 and 104. In such case, the wireless broadband network 108 may be a cellular wireless network that provides high speed data service, e.g., CDMA2000, UMTS, etc., a microwave network, a fixed wireless network, or another wireless connection. Still alternately, the broadband connection may be serviced via an optical network. In still another embodiment, the wired broadband network 106 services one broadband connection while the wireless broadband network 108 services another broadband connection. In any case, the WLAN VoIP service accumulator 120 will typically be an element of, or coupled to the wired broadband network 106 and/or the wireless broadband network 108.

The home wireless routers 102 and/or 104, the broadband networks 106 and/or 108, a WLAN Voice over Internet Protocol (VoIP) voice accumulator 120, and the Internet 110 (among other components) service VoIP calls for wireless terminals 114A, 114B, 116A, 116B, 118A, and 118B. The home wireless routers 102 and 104 determine particular needs of the wireless terminals 114A, 114B, 116A, 116B, 118A, and 118B and service the VoIP calls accordingly. The home wireless routers 102 and 104 operate in cooperation with the WLAN VoIP service accumulator 120 to meet these needs. These operations will be described further herein with reference to FIGS. 2-8.

According to another aspect of the present invention, at least one of the wireless terminals has dual wireless interfaces. One of the wireless interfaces allows a wireless terminal to interface with a cellular network 112 while another of the wireless interfaces allows the wireless terminal to interface with one of the home wireless routers 102 and 104. Operation according to the present invention includes handing over a VoIP call from the cellular network 112 to a WLAN serviced by either home wireless router 102 or 104. Another operation includes handing over a VoIP call serviced by home wireless router 102 or 104 to the cellular network 112.

Figure 2:
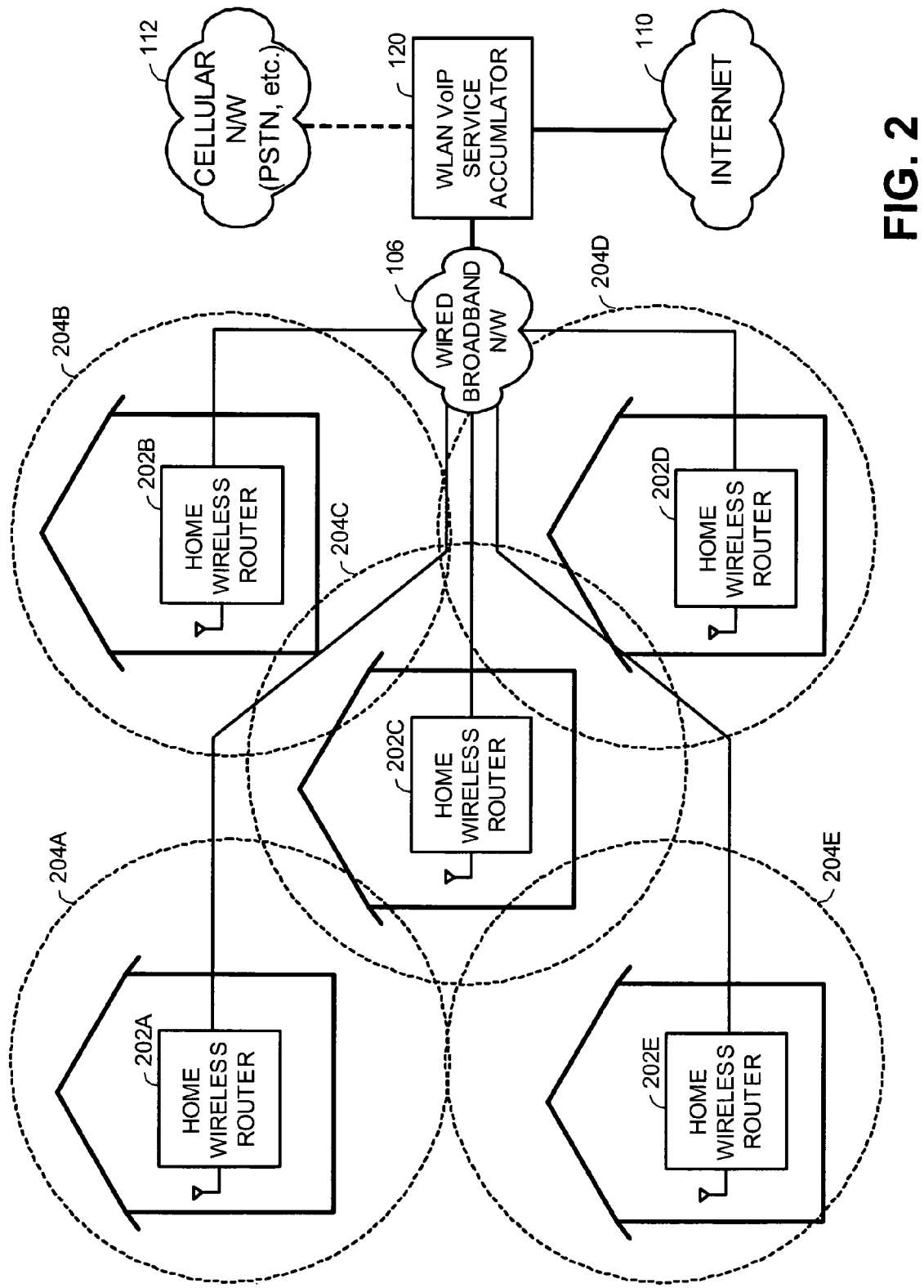
FIG. 2 is a system diagram illustrating a plurality of home wireless routers and their connection to a broadband network.

FIG. 2 is a system diagram illustrating a plurality of home wireless routers and their connection to a broadband network. Each of home wireless routers 202A-202E services a corresponding WLAN service area 204A-204E, respectively. Each of the home wireless routers 202A-202E couples to WLAN VoIP service accumulator 120 via wired broadband network 106. In an alternate embodiment, one or more of the home wireless routers 202A-202E couples to the WLAN VoIP service accumulator 120 via a wireless broadband network 108 (as was illustrated in FIG. 1). In combination, the WLAN service areas 204A-204E form a combined WLAN service area as illustrated. According to some aspects of the present invention, the WLAN VoIP service accumulator 120 works in conjunction with the home wireless router 202A-202E to provide wireless service in the combined WLAN service area formed by the plurality of individual WLAN service areas 204A-204E.

Figure 3:
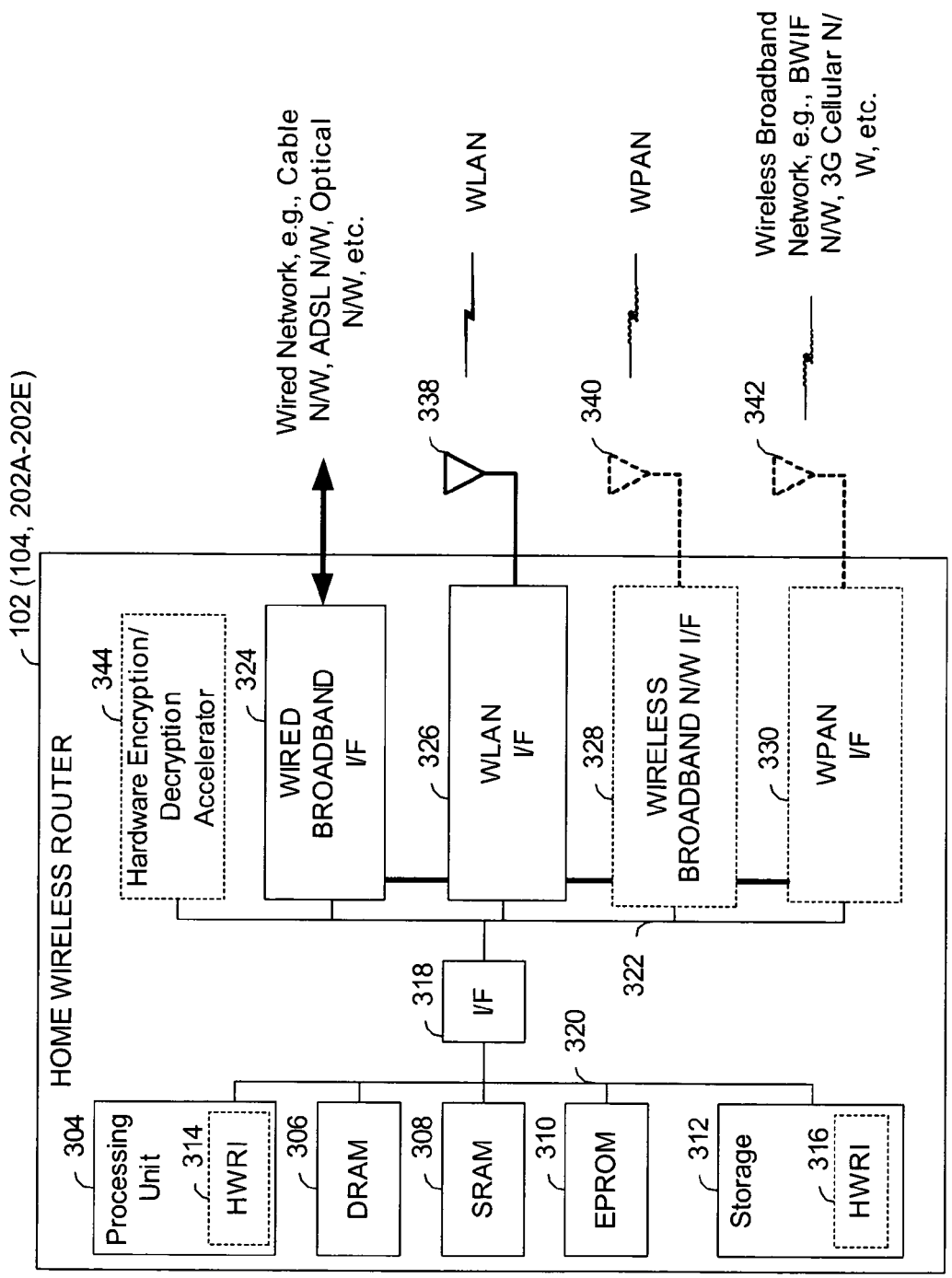
FIG. 3 is a block diagram illustrating a home wireless router constructed and operating according to the present invention.

FIG. 3 is a block diagram illustrating a home wireless router constructed and operating according to the present invention. The home wireless router 102 (104, 202A-202E) includes a processing unit 304, Dynamic Random Access Memory (DRAM) 306, Static Random Access Memory (SRAM) 308, Erasable Programmable Read Only Memory (EPROM) 310, and storage 312. The processing unit 304 may be a microprocessor, a digital signal processor, a collection of microprocessors and/or digital signal processors, and/or any type of processing unit that is known to be able to execute software instructions and interface with other components. The DRAM 306, SRAM 308, and EPROM 310 are examples of types of memory that may be used in conjunction with the processing unit 304. The storage 312 may be hard-disk storage, tape storage, optical storage, or other types of storage that stores digital information that may be operated upon or executed by processing unit 304.

Home wireless router instructions (HWRI) 316 are stored in storage 312 and executed by processing unit 304 as HWRI 314. During certain portions of their execution, HWRI 316 may be written to one or more of DRAM 306, SRAM 308, and/or EPROM 310 prior to loading into the processing unit 304 as HWRI 314. The storage, loading, and execution of software instructions are generally known and will not be described further herein, except as it relates particularly to the operations of the present invention.

The processing unit 304, DRAM 306, SRAM 308, EPROM 310, and storage 312 intercouple via one or more processor buses 320. Processor bus 320 couples to peripheral bus 322 via interface 318. Coupled to peripheral bus 322 are wired broadband interface 324, WLAN interface 326, WPAN interface 330, and other components that may be present in various embodiments of the home wireless router. The wired broadband interface 324 interfaces to the broadband connection, which couples the home wireless router 102 to a broadband network, e.g., a cable network, an optical network, or another type of broadband network. The home wireless router 102 may also/alternatively include a wireless broadband network interface 328 and antenna 340 that provide a broadband wireless connection to a wireless broadband network.

The WLAN interface 326 couples to antenna 338 and services the WLAN within a WLAN service area of the home wireless router 102, as previously described with reference to FIG. 2. The WLAN interface 326, as was previously described, supports one or more of various WLAN protocol standards. Such protocol standards may include the IEEE 802.11a, IEEE 802.11b, IEEE 802.11g, and/or IEEE 802.11n protocol standards. The home wireless router 102 may further include the WPAN interface 330 that services a WPAN network about the home wireless router 102. The WPAN interface 330 services the Bluetooth protocol standard, the IEEE 802.15 protocol standard, or another similar standard.

According to one aspect of the present invention, the home wireless router 102 services multiple types of encryption and decryption operations. Particularly, the home wireless router 102 supports WLAN encryption operations for serviced VoIP wireless terminals and broadband encryption operations for the broadband network. Thus, in some embodiments, the home wireless router 102 includes a hardware encryption/decryption accelerator 344 for servicing the WLAN encryption operations and/or the broadband encryption/decryption operations. In some cases, the processing unit 304 services the WLAN encryption/decryption operations and/or the broadband encryption operations.

Figure 4:
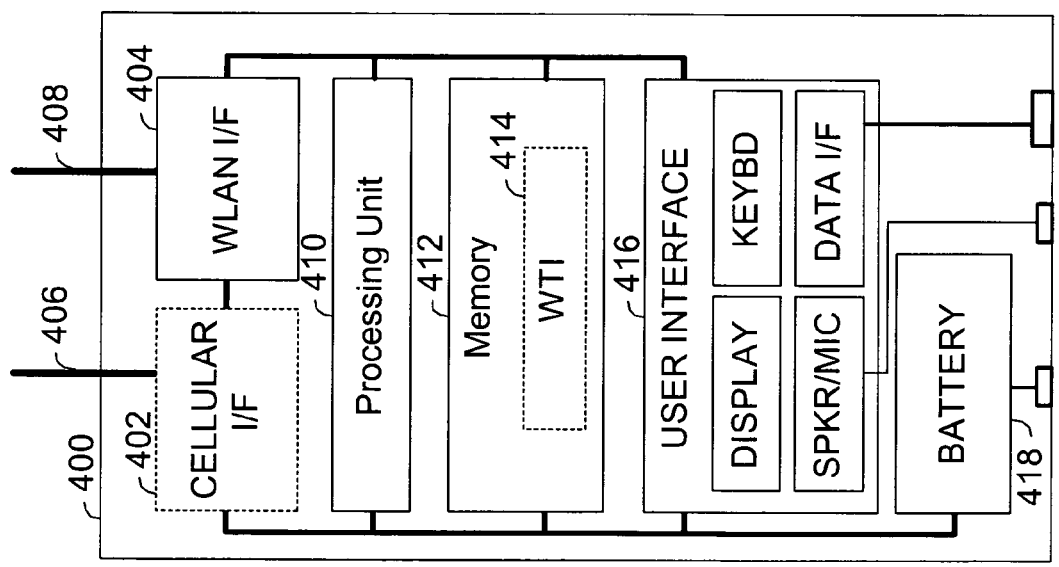
FIG. 4 is a block diagram illustrating a wireless terminal that services Voice over Internet Protocol (VoIP) operations according to the present invention.

FIG. 4 is a block diagram illustrating a wireless terminal that services VoIP operations according to the present invention. The VoIP wireless terminal 400 includes a WLAN interface 404 and may include a cellular interface 402. The WLAN interface 404 couples to antenna 408 and services WLAN communications with a home wireless router 102 or 104 as illustrated in FIG. 1. The cellular interface 402 and antenna 406 service communications with a cellular network 112 as illustrated in FIG. 1. Depending upon the particular construct of the VoIP wireless terminal 400, the cellular interface 402 may support a TDMA standard, e.g., IS-136, GSM, et cetera, a CDMA standard, e.g., IS-95A, IS-95B, 1XRTT, 1XEV-DO, 1XEV-DV, et cetera, or another cellular interface standard.

The VoIP wireless terminal 400 further includes a processing unit 410, memory 412, a user interface 416, and a battery 418. The processing unit may be a microprocessor, a digital signal processor, a combination of a microprocessor and digital signal processor or another type of processing device. The memory 412 may be SRAM, DRAM, or another type of memory that is generally known. Stored in memory 412 are Wireless Terminal Instructions (WTIs) that are loaded into processing unit 410 for execution. These WTIs 414 may include WLAN and/or broadband encryption algorithm operations according to the present invention, as well as other instructions that cause the VoIP wireless terminal 400 to support VoIP operations. User interface 416 includes the display, keyboard, speaker/microphone, and a data interface. The data interface may be a wireless personal area network (WPAN) interface such as the Bluetooth interface or an IEEE 802.15 interface. Battery 418 provides power for the components of the VoIP wireless terminal.

Figure 5:
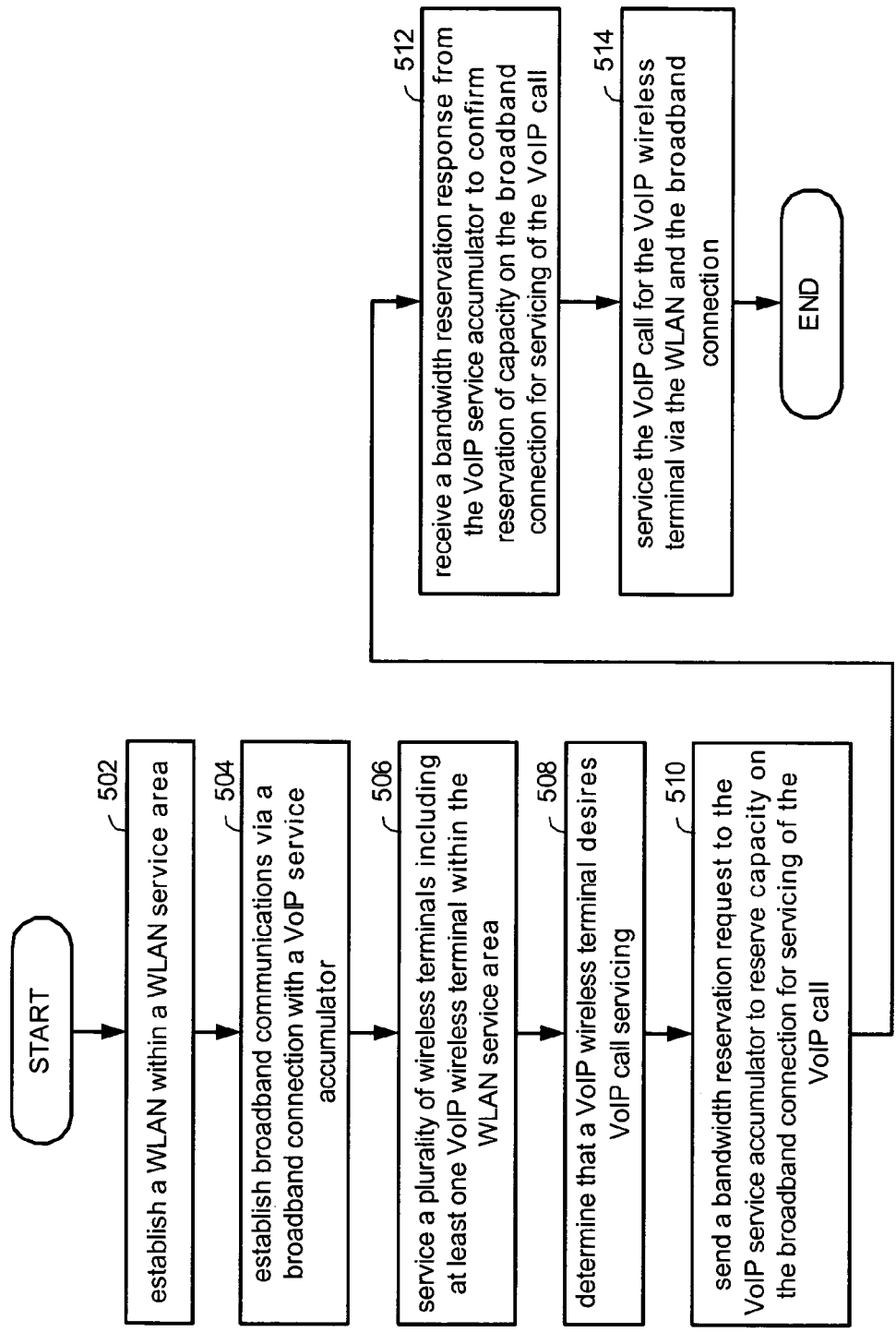
FIG. 5 is a flow chart illustrating the operation of a home wireless router according to the present invention.

FIG. 5 is a flow chart illustrating the operation of a home wireless router according to the present invention. Operations commence with the home wireless router establishing a WLAN within a WLAN service area (step 502). Generally, a WLAN is established according to the standardized protocol operations set forth in the relevant operating standards, which have been previously described. The WLAN service area is typically setup about the home wireless router. Next, operation includes establishing broadband communications via a broadband connection with a VoIP service accumulator (step 504). This broadband connection will be a wired connection, a wireless connection, or an optical connection. As was previously described with reference to FIGS. 1 and 2, the broadband connection may be serviced by a cable modem network, an optical link, etc. Further, the broadband connection may be a wireless point-to-point connection.

Operation continues with servicing a plurality of wireless terminals within the WLAN service area. Such servicing will include servicing at least one VoIP wireless terminal in the WLAN service area (step 506). Operation next includes determining that a VoIP wireless terminal desires VoIP call servicing within the WLAN service area (step 508). Upon making this determination, a bandwidth reservation request is sent from the home wireless router to the VoIP service accumulator via the broadband connection. The bandwidth reservation request is made in an attempt to reserve capacity on the broadband connection for servicing of the VoIP call of the VoIP wireless terminal (step 510). This bandwidth reservation request may conform to the resource reservation protocol (RSVP) operations. When the data reservation request conforms to the RSVP operations, servicing of the VoIP call for the VoIP wireless terminal may proceed according to the real batch time to transport protocol (RTP).

Operation continues in receiving a bandwidth reservation response from the VoIP service accumulator to confirm reservation of capacity of the broadband connection for servicing of the VoIP call (step 512). Again, the operations at step 512 may conform to the RSVP operations and in such case servicing the call may correspond to the RTP operations. Finally, with the bandwidth on the broadband connection reserved, operation includes servicing the VoIP call for the VoIP wireless terminal via the WLAN and the broadband connection (step 514). The VoIP call is serviced until terminated by either the VoIP wireless terminal or the far end VoIP terminal coupled via the Internet 110 or the broadband network.

Figure 6:
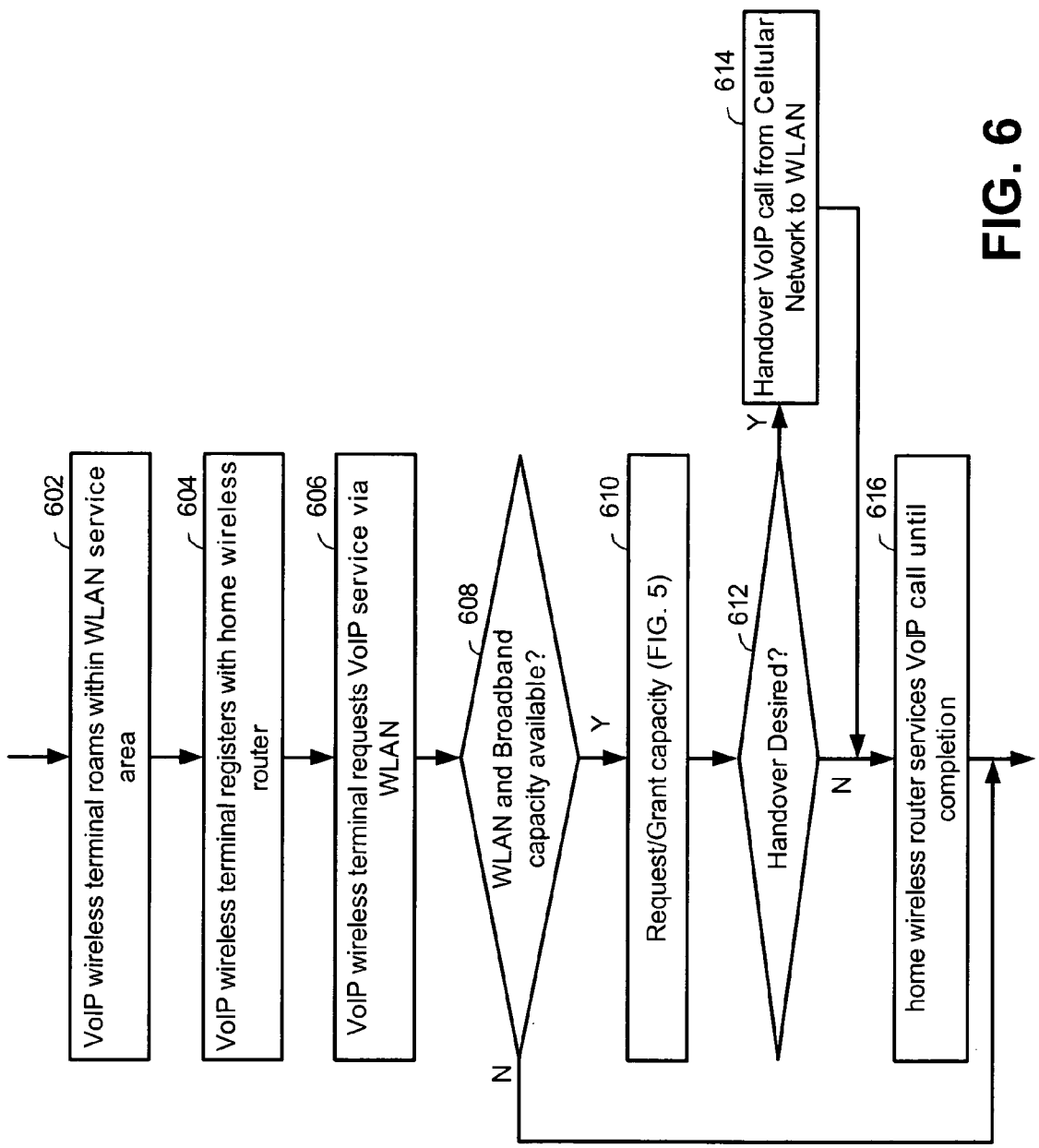
FIG. 6 is a flow chart illustrating operation according to the present invention in handing over a VoIP call from a cellular network to a WLAN.

FIG. 6 is a flow chart illustrating operation of the present invention in handing over a VoIP call from a cellular network to a WLAN. The operation of FIG. 6 commences with a VoIP wireless terminal roaming within a WLAN service area of a corresponding home wireless router (step 602). When the VoIP wireless terminal roams into the WLAN service area, the VoIP wireless terminal registers with the home wireless router servicing the WLAN service area (step 604). When the VoIP terminal roams into a WLAN service area, or at some time thereafter, the VoIP wireless terminal requests VoIP call service from the WLAN (step 606). Prior to servicing the VoIP call service request, the home wireless router determines whether WLAN and broadband connection capacity is available for such servicing (step 608). In making this determination, the home wireless router may consider channel usage within the WLAN service area and/or its current broadband connection usage.

If either the WLAN or the broadband connection does not have sufficient capacity to service the VoIP call, the wireless terminal is denied access to the WLAN for VoIP call servicing. However, if capacity is available on both of these segments, the operation of FIG. 5 may be employed to request capacity on the broadband connection and to be granted capacity on the broadband connection (step 610). With the capacity of the broadband connection granted, it is next determined whether handover of the VoIP call from the cellular network is desired (step 612).

Handover of the VoIP call is only required if an ongoing VoIP call is being serviced by the cellular network. When the wireless terminal simply desires to initiate a VoIP call within the WLAN, no such handover is required. However, if handover of the VoIP call is required from the cellular network to the WLAN, such operation is completed (step 614). In order to handover the VoIP call from the cellular network to WLAN, interaction with the cellular network 112 is required. Interaction with the cellular network requires signaling between the home wireless router and a signaling element of the cellular network 112. This signaling may alternately be provided by the VoIP service accumulator instead of directly between the home wireless router with the cellular network 112. In such case, the VoIP service accumulator acts as an agent for the home wireless router. When handoff is completed (from step 614) or when handoff is not required (from step 612), the home wireless router services the VoIP call until completion (step 616). From step 616, operation is completed.

Figure 7:
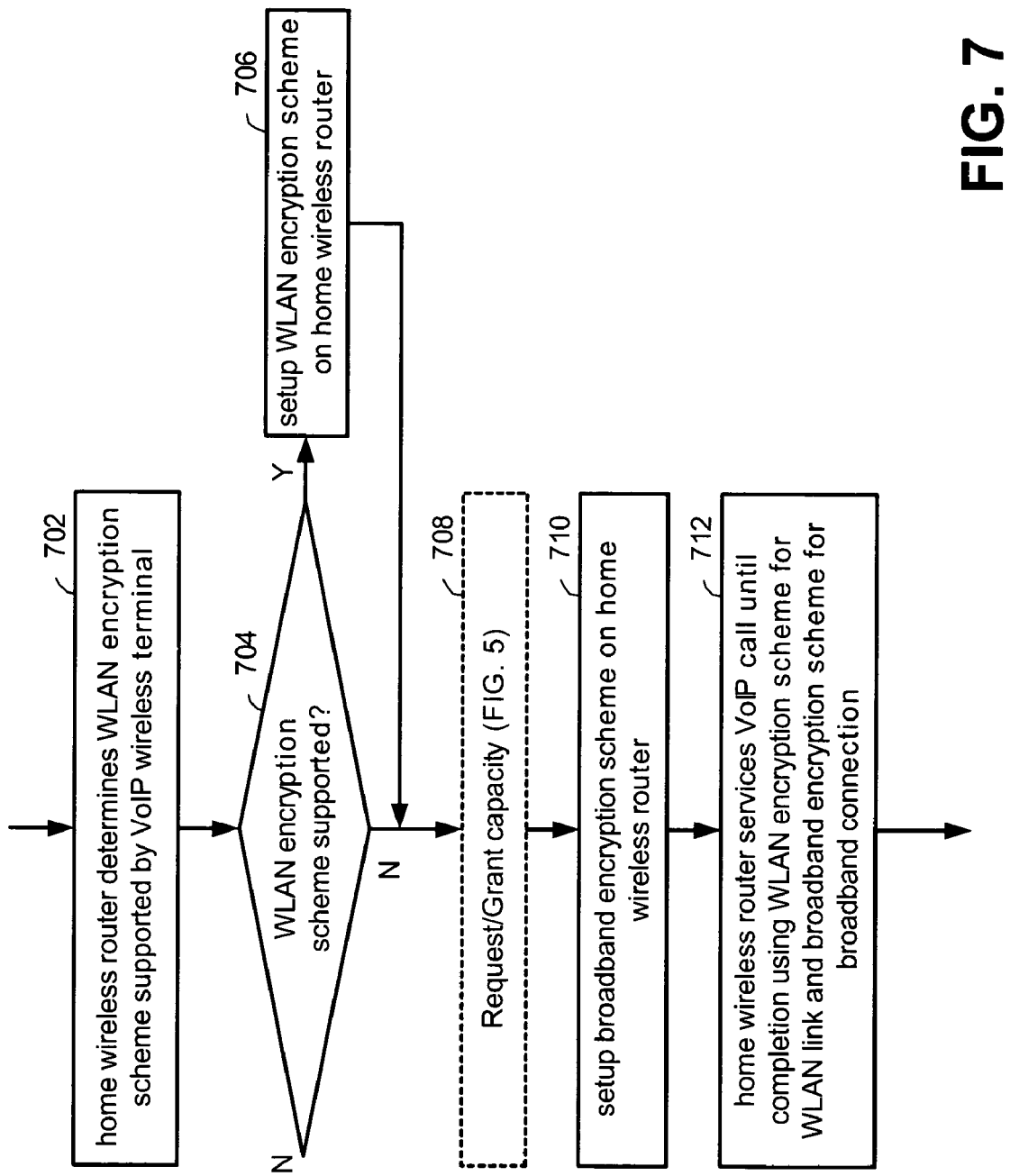
FIG. 7 is a flow chart illustrating operation according to the present invention in servicing both WLAN and broadband encryption schemes.

FIG. 7 is a flow chart illustrating operation according to the present invention in servicing both WLAN and broadband encryption schemes. Referring now to FIG. 7, when servicing a VoIP call for a wireless terminal, a particular encryption scheme may be employed by the VoIP wireless terminal. The WLAN interface of the home wireless router will typically support one or more encryption schemes. Currently, WLANs support various WLAN encryption schemes. One particular WLAN encryption scheme is the Wired Equivalency Privacy (WEP) encryption protocol. Another WLAN encryption scheme is the Wi-Fi Protected Access (WPA) encryption protocol. The WPA encryption protocol is similar to the IEEE 802.11i encryption protocol, which may be referred to as WPA2. Each of these WLAN encryption schemes provides some security for WLAN VoIP calls. These types of WLAN encryption schemes, however, are typically less secure than broadband encryption schemes serviced by other types of communication devices. According to one aspect of the present invention, WLAN encryption schemes are supported for WLAN communications while broadband encryption schemes are supported for communications on the broadband connection.

Thus, according to the present invention, when the home wireless router initially services a VoIP call for a VoIP wireless terminal, the home wireless router identifies a WLAN encryption scheme that the VoIP wireless terminal supports (step 702). In other operations, the home wireless router will presume a particular WLAN encryption scheme that the VoIP wireless terminal supports. The home wireless router then determines whether it supports the WLAN encryption scheme of the VoIP wireless terminal (step 704). If the home wireless router does support the WLAN encryption scheme employed by the VoIP wireless terminal, the home wireless router sets up the WLAN encryption scheme for servicing (step 706).

Next, from both step 706 and from a negative determination at step 704, the home wireless router optionally requests and is granted capacity on the broadband connection for servicing of the VoIP call (step 708). Then, in servicing the VoIP call for the VoIP wireless terminal, the home wireless router sets up a broadband encryption scheme for subsequent communications via the broadband connection (step 710). Finally, the home wireless router services the VoIP call until completion using a WLAN encryption scheme for the WLAN link and a broadband encryption scheme for the broadband connection (step 712). Thus, WLAN wireless communications between the VoIP wireless terminal and the home wireless router are protected by a WLAN encryption scheme while the wired communications and the broadband connection are protected by a broadband encryption scheme.

Referring again to FIG. 3, the broadband encryption scheme(s) may be implemented and serviced by the hardware encryption/decryption accelerator 344. Further, the processing unit 304 of the home wireless router 102 via its HWRI 314 may service one or both of the encryption schemes.

Figure 8:
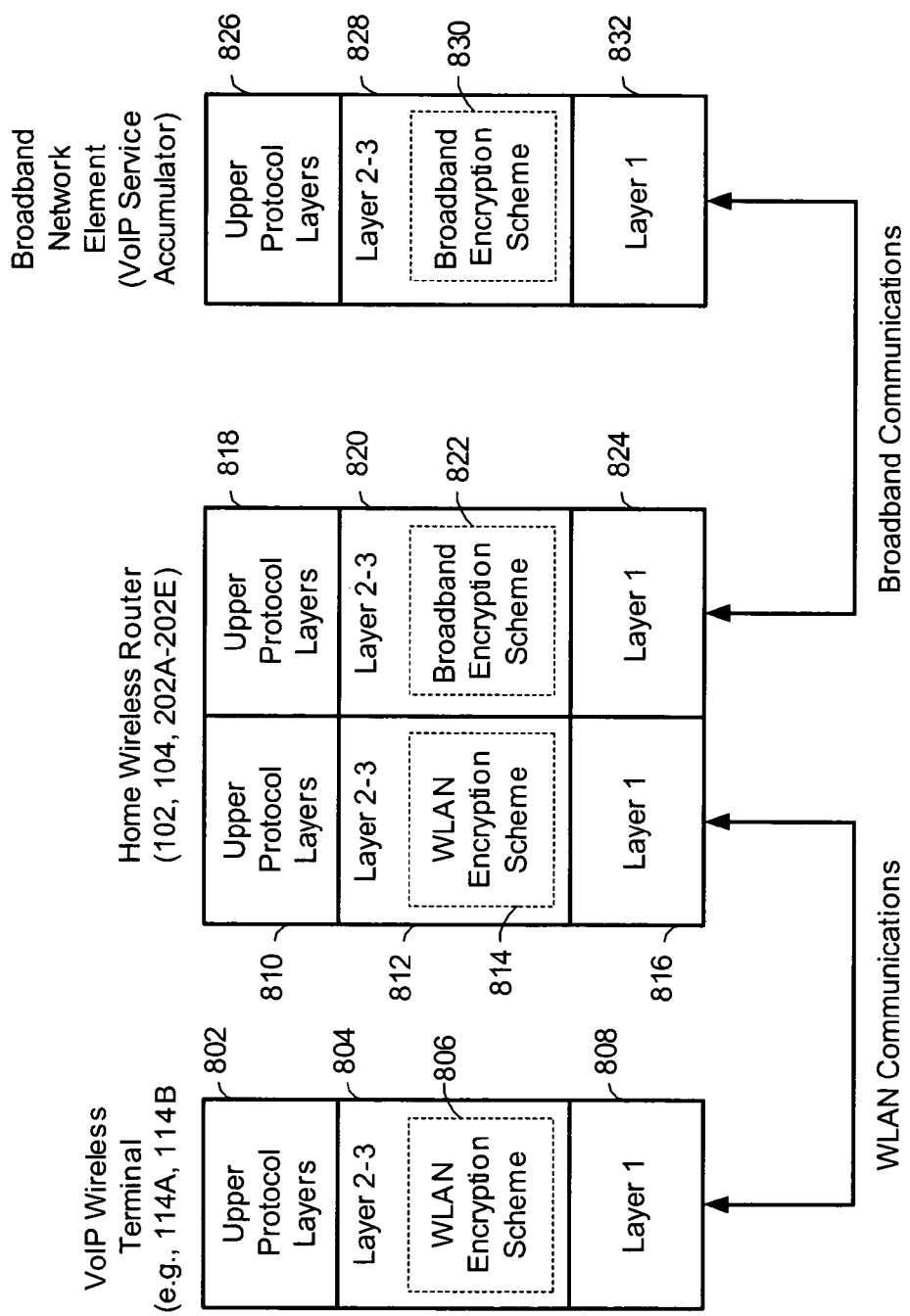
FIG. 8 is a block diagram illustrating the manner in which WLAN encryption schemes and broadband encryption schemes are serviced according to the present invention.

FIG. 8 is a block diagram illustrating the manner in which WLAN encryption schemes and broadband encryption schemes are serviced according to the present invention. The protocol layer operations of the VoIP wireless terminal, the home wireless router, and a broadband network element, e.g., the VoIP service accumulator are illustrated. Protocol layers supported by the VoIP wireless terminal include upper layers 802, layers 2 and 3 804, and layer 1 808. In the embodiment of FIG. 8, the WLAN encryption scheme 806 is implemented in layer 2 and/or layer 3 804 on the VoIP wireless terminal. As was previously described, examples of the WLAN encryption scheme are the WEP standard, the WPA standard, and the 802.11i encryption standard (WPA2), among others.

Layer 1 808 of the VoIP wireless terminal communicates directly with layer 1 816 of the home wireless router via a wireless link of the WLAN. In servicing WLAN communications, the home wireless router includes upper protocol layers 810, layers 2 and 3 812, and layer 1 816. The WLAN encryption scheme 814 serviced by the home wireless router resides at layer 2 and/or layer 3 812.

Home wireless router also includes protocol layers that service broadband communications with the VoIP service accumulator. These protocol layers include upper protocol layers 818, layer 2 and 3 820, and layer 1 824. One example of a broadband encryption scheme 822 serviced by the home wireless router operates at layer 2 and/or layer 3. The broadband communications between the home wireless router and the VoIP service accumulator are via a wired broadband connection, a wireless broadband connection, or an optical broadband connection. In communicating with the home wireless router, the VoIP service accumulator includes layer 1 832, layer 2 and layer 3 828, and upper protocol layers 826.

As one of average skill in the art will appreciate, the term "substantially" or "approximately," as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled." As one of average skill in the art will further appreciate, the term "compares favorably," as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The invention disclosed herein is susceptible to various modifications and alternative forms. Specific embodiments therefore have been shown by way of example in the drawings and detailed description. It should be understood, however, that the drawings and description thereto are not intended to limit the invention to the particular form disclosed, but on the contrary, the invention is to cover all modifications, equivalents and alternatives falling within the spirit and scope of the present invention as defined by the claims.

The invention claimed is:

1. A method for operating a home wireless router comprising, the home wireless router:
   establishing a Wireless Local Area Network (WLAN) that supports wireless communications within a WLAN service area;
   establishing broadband communications via a broadband connection with a VoIP service accumulator;
   servicing a plurality of wireless terminals within the WLAN service area, the plurality of wireless terminals including a Voice over Internet Protocol (VoIP) wireless terminal, wherein the VoIP wireless terminal is also capable of communicating through a cellular network;
   determining that the VoIP wireless terminal, which is being serviced by a cellular network, has roamed into the WLAN service area and desires VoIP call servicing of ongoing communication via the WLAN;
   sending a bandwidth reservation request to the VoIP service accumulator to reserve capacity on the broadband connection for servicing of a VoIP call;
   receiving a bandwidth reservation response from the VoIP service accumulator to confirm reservation of capacity on the broadband connection for servicing of the VoIP call; and
   servicing the VoIP call via the WLAN and the broadband connection only when bandwidth capacity is reserved, by having the VoIP service accumulator effect transfer of servicing of the VoIP wireless terminal from the cellular network to the WLAN for transfer of the ongoing communication from the cellular network to the WLAN via the broadband connection.

2. The method of claim 1, wherein:
   the broadband connection is serviced by a cable modem network; and
   the VoIP service accumulator is an element of the cable modem network.

3. The method of claim 1, wherein the broadband connection is wireless and is selected from the group consisting of a cellular network connection, a microwave connection, and a fixed wireless connection.

4. The method of claim 1, wherein the broadband connection is wired and is selected from the group consisting of at least a DSL connection, a DSL2 connection, an ADSL connection, and an ADSL2 connection.

5. The method of claim 1, wherein the bandwidth reservation request conforms to the Resource Reservation Protocol (RSVP).

6. The method of claim 5, wherein servicing the VoIP call for the VoIP wireless terminal via the broadband connection proceeds according to the Real-Time Transport Protocol (RTP).

7. The method of claim 1, further comprising limiting access to the WLAN in order to adequately service the VoIP call.

8. The method of claim 1, further comprising:
   terminating a WLAN encryption scheme serviced by the VoIP wireless terminal; and
   servicing the VoIP call via the broadband connection using a broadband encryption scheme.

9. A home wireless router comprising:
   a Wireless Local Area Network (WLAN) interface;
   a broadband interface; and
   a processing unit communicatively coupled to the WLAN interface and to the broadband interface, wherein the processing unit is operable to:
   direct the WLAN interface to service a plurality of wireless terminals within a WLAN service area, the plurality of wireless terminals including a Voice over Internet Protocol (VoIP) wireless terminal, wherein the VoIP wireless terminal is also capable of communicating through a cellular network;
   direct the broadband interface to establish broadband communications with a VoIP service accumulator via a broadband connection;
   determine that the VoIP wireless terminal, which is being serviced by a cellular network, has roamed into the WLAN service area and desires VoIP call servicing of ongoing communication via the WLAN;
   send a bandwidth reservation request to the VoIP service accumulator via the broadband interface to reserve capacity on the broadband connection to service the VoIP call;
   receive a bandwidth reservation response from the VoIP service accumulator via the broadband interface to confirm reservation of capacity on the broadband connection to service a VoIP call; and
   direct the WLAN interface and the broadband interface to service the VoIP call via the WLAN and the broadband connection when bandwidth capacity is reserved, by having the VoIP service accumulator effect transfer of servicing of the ongoing communication of the VoIP wireless terminal from the cellular network to the WLAN via the broadband connection.

10. The home wireless router of claim 9, wherein:
    the broadband connection is a cable modem network connection; and
    the VoIP service accumulator is an element of the cable modem network.

11. The home wireless router of claim 9, wherein the broadband connection is wireless and is selected from the group consisting of a cellular network connection, a microwave connection, and a fixed wireless connection.

12. The home wireless router of claim 9, wherein the broadband connection is wired and is selected from the group consisting of at least a DSL connection, a DSL2 connection, an ADSL connection, and an ADSL2 connection.

13. The home wireless router of claim 9, wherein the bandwidth reservation request conforms to the Resource Reservation Protocol (RSVP).

14. The home wireless router of claim 13, wherein servicing the VoIP call for the VoIP wireless terminal proceeds according to the Real-Time Transport Protocol (RTP).

15. The home wireless router of claim 9, wherein the processing unit is operable to direct the WLAN interface to limit access to the WLAN in order to adequately service the VoIP call.

16. The home wireless router of claim 9, wherein the processing unit is further operable to:
    terminate a WLAN encryption scheme serviced by the VoIP wireless terminal; and
    cause at least one component of the home wireless router to service the VoIP call via the broadband connection using a broadband encryption scheme.

\* \* \* \* \*